(12) United States Patent
Takahashi

(10) Patent No.: US 10,867,389 B2
(45) Date of Patent: Dec. 15, 2020

(54) IMAGE PROCESSING APPARATUS, IMAGE PICKUP APPARATUS, METHOD FOR CONTROLLING IMAGE PROCESSING APPARATUS AND STORAGE MEDIUM

(71) Applicant: CANON KABUSHIKI KAISHA, Tokyo (JP)

(72) Inventor: Yoichi Takahashi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 16/013,414

(22) Filed: Jun. 20, 2018

(65) Prior Publication Data

US 2019/0005654 A1 Jan. 3, 2019

(30) Foreign Application Priority Data

Jun. 28, 2017 (JP) ................................ 2017-126240

(51) Int. Cl.
| | |
|---|---|
| *H04N 19/51* | (2014.01) |
| *H04N 19/136* | (2014.01) |
| *H04N 19/139* | (2014.01) |
| *G06T 7/20* | (2017.01) |
| *G06T 7/11* | (2017.01) |

(Continued)

(52) U.S. Cl.
CPC .............. *G06T 7/20* (2013.01); *G06F 3/0346* (2013.01); *G06K 9/6215* (2013.01); *G06T 5/002* (2013.01); *G06T 5/50* (2013.01); *G06T 7/11* (2017.01); *G06T 7/136* (2017.01); *G06T 7/246* (2017.01); *G06T 7/30* (2017.01); *G06T 7/97* (2017.01); *H04N 5/23238* (2013.01); *H04N 5/23245* (2013.01); *H04N 5/23254* (2013.01); *H04N 5/23258* (2013.01); *G06T 2207/10016* (2013.01); *G06T 2207/10024* (2013.01); *G06T 2207/20021* (2013.01);
(Continued)

(58) Field of Classification Search
USPC ................ 382/103–154, 162–225, 269–308, 382/312–325; 396/7, 14–20, 25, 48–59, 396/83–88, 94–104, 110–125, 144, 153, 396/308, 322–325, 333–340, 471
See application file for complete search history.

(56) References Cited

U.S. PATENT DOCUMENTS

| | | | |
|---|---|---|---|
| 2002/0044691 A1* | 4/2002 | Matsugu | G06K 9/20 |
| | | | 382/218 |
| 2004/0264740 A1* | 12/2004 | Song | H04N 7/0112 |
| | | | 382/103 |

(Continued)

FOREIGN PATENT DOCUMENTS

| | | |
|---|---|---|
| JP | 2004-134993 A | 4/2004 |
| JP | 2014-519739 A | 8/2014 |
| JP | 2008089314 A | 4/2018 |

*Primary Examiner* — Marcellus J Augustin
(74) *Attorney, Agent, or Firm* — Canon U.S.A., Inc. IP Division

(57) ABSTRACT

An image processing apparatus detects motion information of an image capturing unit in a time period between capturing of a first image and capturing of a second image by the image capturing unit, and detects a plurality of motion vectors between the first image and the second image. Further, the image processing apparatus determines reliability of the detected motion information, and determines, based on the motion information and the reliability, a motion vector to be used for alignment of the first image and the second image, from the plurality of motion vectors.

20 Claims, 9 Drawing Sheets

(51) Int. Cl.
    *G06T 7/30*         (2017.01)
    *G06T 7/00*         (2017.01)
    *G06K 9/62*         (2006.01)
    *G06F 3/0346*     (2013.01)
    *G06T 7/136*      (2017.01)
    *G06T 5/50*         (2006.01)
    *G06T 7/246*      (2017.01)
    *G06T 5/00*         (2006.01)
    *H04N 5/232*      (2006.01)

(52) U.S. Cl.
    CPC .............. *G06T 2207/20182* (2013.01); *G06T 2207/20201* (2013.01); *G06T 2207/20221* (2013.01)

(56) References Cited

U.S. PATENT DOCUMENTS

| | | | |
|---|---|---|---|
| 2010/0157079 A1* | 6/2010 | Atanassov | H04N 5/23232 348/222.1 |
| 2014/0072180 A1* | 3/2014 | Yamaguchi | G06T 7/254 382/107 |
| 2015/0117539 A1* | 4/2015 | Kobayashi | H04N 19/176 375/240.16 |
| 2017/0347005 A1* | 11/2017 | Kimura | H04N 5/265 |

* cited by examiner

IMAGE PROCESSING APPARATUS, IMAGE PICKUP APPARATUS, METHOD FOR CONTROLLING IMAGE PROCESSING APPARATUS AND STORAGE MEDIUM

BACKGROUND OF THE INVENTION

Field of the Invention

The present invention relates to an image processing apparatus, and particularly relates to an image processing apparatus that performs alignment of a plurality of images.

Description of the Related Art

There is known a technique for performing panoramic synthesis, by capturing a plurality of images while moving a digital camera, and combining the captured images. In the panoramic synthesis, it is necessary to align images, in order to acquire a synthetic image free from inadequacies. Japanese Patent Application Laid-Open No. 2004-134993 discusses a method for performing alignment by using a motion vector.

However, accurate alignment is difficult to perform if a motion vector is incorrectly detected.

Therefore, Japanese Unexamined Patent Application Publication (Translation of PCT Application) No. 2014-519739 discusses a technique for improving the accuracy of alignment. This technique detects motion information of a digital camera by using a device such as a gyro sensor, and determines an incorrect motion vector based on this motion information. The incorrect motion vector is then excluded from the alignment.

However, in a case where a sensor for detecting motion information of a digital camera such as a gyro sensor is used, the reliability of the detected motion information of the digital camera may vary due to a plurality of factors including an image capturing condition. In the technique discussed in Japanese Unexamined Patent Application Publication (Translation of PCT Application) No. 2014-519739, no consideration is given to the reliability of the motion information detected by the device such as the gyro sensor. As a result, a correct motion vector may be excluded.

SUMMARY OF THE INVENTION

The present disclosure is directed to determination of an incorrect motion vector, by referring to the reliability of motion information, when performing alignment between images by using the motion information and a motion vector.

According to an aspect of the present disclosure, an image processing apparatus includes at least one memory configured to store instructions and at least one processor connected to the at least one memory and configured to execute the instructions to perform first detection to detect motion information of an image sensor in a time period between capturing of a first image and capturing of a second image by the image sensor, based on an output of a sensor different from the image sensor, perform second detection to detect a plurality of motion vectors between the first image and the second image, determine reliability of the motion information detected in the first detection, and perform alignment of the first image and the second image, based on at least a part of the plurality of motion vectors, wherein the at least one processor executes further instruction to determine the motion vector to be used for the alignment, based on the motion information and the reliability.

Further features of the present disclosure will become apparent from the following description of exemplary embodiments with reference to the attached drawings.

DESCRIPTION OF THE EMBODIMENTS

Exemplary embodiments of the present disclosure will be described in detail below, with reference to the attached drawings.

Figure 1:
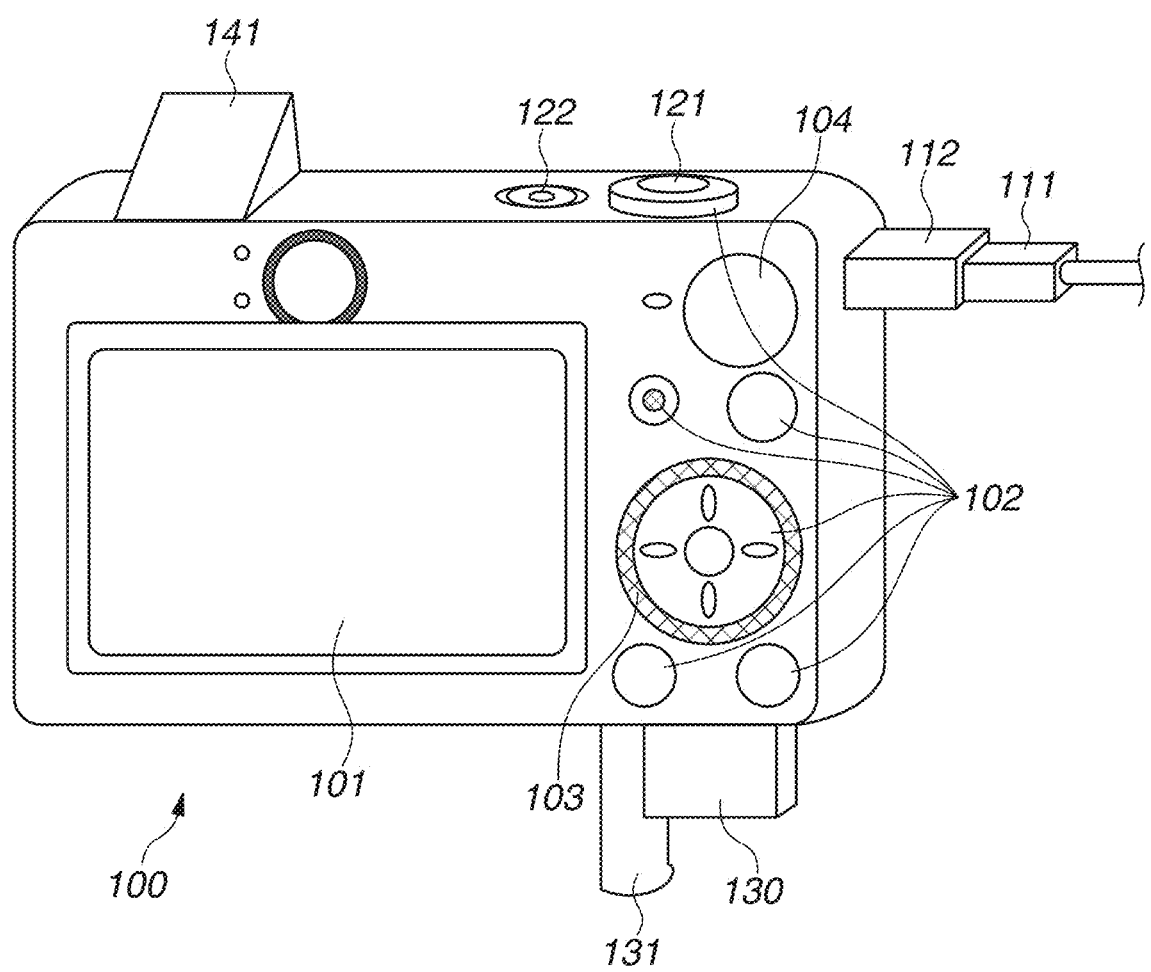
FIG. 1 is a back perspective diagram illustrating a schematic configuration of a digital camera according to an exemplary embodiment of the present disclosure.

FIG. 1 is a back perspective diagram illustrating a schematic configuration of a digital camera according to an exemplary embodiment of the present disclosure.

A digital camera 100 includes a display unit 101 and an operation unit 102 that are provided on the back surface of the digital camera 100. The display unit 101 displays images and various kinds of information. The operation unit 102 includes operation members such as various switches and buttons for receiving various operations performed by a user. Further, a controller wheel 103 and a mode selection switch 104 are provided on the back surface of the digital camera 100. The controller wheel 103 can be operated to rotate. The mode selection switch 104 is provided to switch between modes including image capturing modes. Furthermore, a shutter button 121, a power switch 122, and a flash 141 are provided on the top surface of the digital camera 100. The shutter button 121 provides an image capturing instruction. The power switch 122 is provided to switch on/off of the power of the digital camera 100. The flash 141 emits a flash to an object.

The digital camera 100 can be connected to an external device via a connection cable 111 and a connector 112. The digital camera 100 can output data such as image data (still image data, and moving image data) to the external device. A storage medium slot (not illustrated) is provided on the undersurface of the digital camera 100. The storage medium slot can be opened and closed with a lid 131. A storage medium 130 such as a memory card can be inserted into the storage medium slot.

The storage medium 130 stored in the storage medium slot can communicate with a system control unit 210 (see FIG. 2) of the digital camera 100. The storage medium 130 is not limited to a medium such as a memory card that can be inserted into and removed from the storage medium slot. The storage medium 130 may be an optical disk such as a digital versatile disk rewritable (DVD-RW), or a magnetic disk such as a hard disk. Further, the storage medium 130 may be built into the main body of the digital camera 100.

Figure 2:
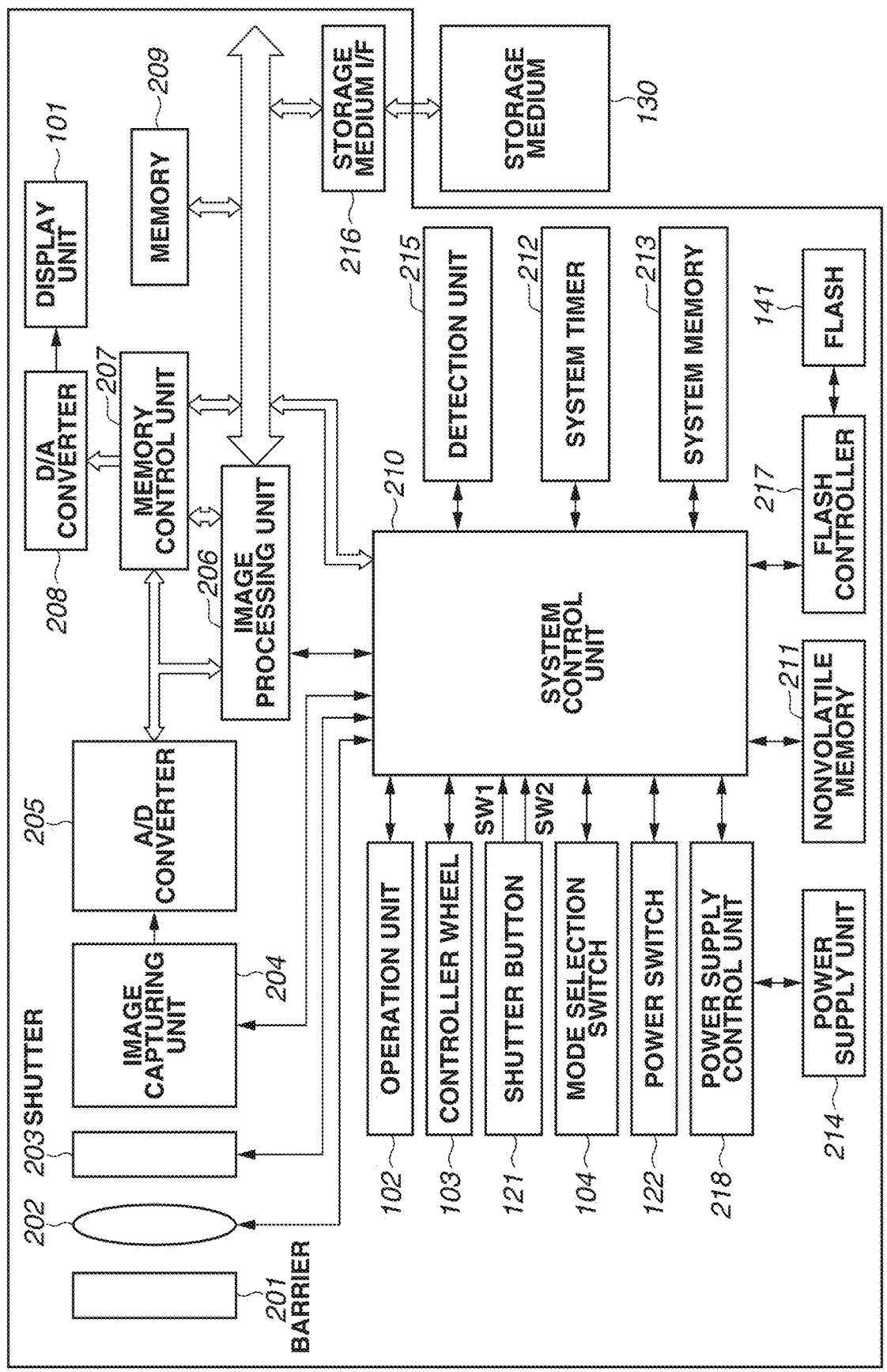
FIG. 2 is a block diagram illustrating a hardware configuration of a digital camera according to an exemplary embodiment of the present disclosure.

FIG. 2 is a block diagram illustrating a hardware configuration of the digital camera 100. The digital camera 100 includes a barrier 201, an image capturing lens 202, a shutter 203, and an image capturing unit 204. The barrier 201 prevents dirt and damage of an image-capturing optical system by covering the image-capturing optical system. The image capturing lens 202 is configured of a lens group including a zoom lens and a focus lens, and forms the image-capturing optical system. The shutter 203 includes an aperture function and adjusts an exposure amount for the image capturing unit 204. The image capturing unit 204 is an image capturing element that converts an optical image into an electrical signal (an analog signal). The image capturing unit 204 is, for example, an image sensor such as a charge coupled device (CCD) sensor or a complementary metal oxide semiconductor (CMOS) sensor having a Bayer array structure in which RGB pixels are regularly arranged. The shutter 203 may be a mechanical-type shutter (hereinafter referred to as "mechanical shutter"), or may be an electronic shutter that controls an accumulation period by controlling the reset timing of the image capturing element.

Alternatively, the image capturing unit 204 may have a structure wherein a plurality of photoelectric conversion units is provided in one pixel, with which a stereo image can be acquired. In this case, auto-focusing (AF) processing to be described below can be performed more quickly.

The digital camera 100 includes an analog-to-digital (A/D) converter 205, an image processing unit 206, a memory control unit 207, a digital-to-analog (D/A) converter 208, a memory 209, and the system control unit 210. An analog signal is output from the image capturing unit 204 to the A/D converter 205. The A/D converter 205 converts the acquired analog signal into image data formed of a digital signal and outputs the image data to the image processing unit 206 or the memory control unit 207.

The image processing unit 206 performs correction processing such as pixel interpolation and shading correction, white balance processing, gamma correction processing, and color conversion processing, on image data acquired from the A/D converter 205 or data acquired from the memory control unit 207. Further, the image processing unit 206 implements an electronic zoom function by performing image cut-out processing and variable magnification processing. Furthermore, the image processing unit 206 performs predetermined arithmetic processing by using image data of a captured image, and the system control unit 210 performs exposure control and ranging control based on the result of this arithmetic processing. For example, the system control unit 210 performs autofocus (AF) processing using a through the lens (TTL) method, automatic exposure (AE) processing, and flash pre-emission (EF) processing. The image processing unit 206 performs predetermined arithmetic processing by using image data of a captured image, and the system control unit 210 performs automatic white balance (AWB) processing using the TTL method, by using the result of this arithmetic processing.

The image processing unit 206 has an image synthesis processing circuit. The image synthesis processing circuit synthesizes a panoramic image from a plurality of images, and performs determination as to the result of the synthesis. The image synthesis processing circuit performs not only simple averaging synthesis, but also processing such as lightening synthesis or darkening synthesis that generates a piece of image data by selecting a pixel having the brightest or darkest value in each region of image data serving as a synthesis target. Further, the image synthesis processing circuit evaluates and determines a synthesis result based on a specific standard. The image processing unit 206 may be configured to implement the function of the image synthesis processing circuit by using software processing performed by the system control unit 210, instead of being configured to include the image synthesis processing circuit.

The image data output from the A/D converter 205 is written in the memory 209 via the image processing unit 206 and the memory control unit 207, or via the memory control unit 207. The memory 209 also serves as an image display memory (a video memory) for storing image data to be displayed at the display unit 101. The memory 209 has a storage capacity capable of storing a predetermined number of still images, panoramic images (wide-angle images), and panoramic-image synthesis results. The memory 209 can be used as a work area for the system control unit 210. The system control unit 210 reads out a program from a nonvolatile memory 211, and loads the read-out program into the work area.

The image display data (digital data) stored in the memory 209 is transmitted to the D/A converter 208. The D/A converter 208 converts the received digital data into an analog signal, and supplies the analog signal to the display unit 101. The display unit 101 can therefore display an image. The display unit 101 is a display, such as a liquid crystal display or an organic electroluminescence (EL) display. The display unit 101 displays an image, based on an analog signal from the D/A converter 208. The system control unit 210 switches on/off of image display in the display unit 101. Switching off the image display can reduce power consumption. The D/A converter 208 converts digital signals accumulated in the memory 209 from the image capturing unit 204 via the A/D converter 205, into analog signals, and thereby consecutive display is performed at the display unit 101. An electronic viewfinder function of displaying a live view can be thus implemented.

The digital camera 100 includes the nonvolatile memory 211, a system timer 212, a system memory 213, a detection unit 215, and a flash controller 217. The nonvolatile memory 211 is an electrically erasable/storable memory (such as an electrically erasable programmable read only memory (EEPROM)). The nonvolatile memory 211 stores a program to be executed by the system control unit 210 and values such as a constant for operation. Further, the nonvolatile memory 211 has an area for storing system information and an area for storing user setting information. At the start-up of the digital camera 100, the system control unit 210 reads out and restores various kinds of information and settings stored in the nonvolatile memory 211.

The system control unit 210 includes a central processing unit (CPU). The system control unit 210 controls overall operation of the digital camera 100 by executing various program codes stored in the nonvolatile memory 211. The system control unit 210 reads from the nonvolatile memory 211 a program and values such as a constant for operation and a variable, and loads the read-out program and values into the system memory 213. A random access memory (RAM) is used for the system memory 213. Further, the system control unit 210 performs display control, by controlling components such as the memory 209, the D/A converter 208, and the display unit 101. The system timer 212 measures the time used for various kinds of control and the time of a built-in clock. The flash controller 217 controls the flash emission of the flash 141, according to the brightness of an object. The detection unit 215 includes a gyro and a sensor, and acquires information such as angular velocity information and posture information of the digital camera 100. The angular velocity information includes information indicating angular velocity and angular acceleration in panoramic image capturing by the digital camera 100. The posture information includes information such as a tilt of the digital camera 100 relative to a horizontal direction.

The display unit 101, the operation unit 102, the controller wheel 103, the shutter button 121, the mode selection switch 104, the power switch 122, and the flash 141 illustrated in FIG. 2 are the same as those described with reference to FIG. 1.

Various operation members of the operation unit 102 are used, for example, for selection of various function icons to be displayed by the display unit 101. The operation members are each assigned a function for each scene when a user selects a predetermined function icon. In other words, the operation members of the operation unit 102 each act as various function buttons. Examples of the function buttons include a termination button, a return button, an image forward button, a jump button, a narrowing-down button, an attribute change button, and a DISP button. For example, when a menu button is pressed, the display unit 101 displays a menu screen for performing various kinds of setting. The user can intuitively perform a setting operation, by using the menu screen displayed by the display unit 101 and buttons such as a four-direction (up, down, right, and left) button, and a SET button.

The controller wheel 103 is an operation member that can be operated to rotate. The controller wheel 103 is used together with the four-direction button, for an operation such as specifying a selection item. When the controller wheel 103 is operated to rotate, an electrical pulse signal according to an operation amount (such as a rotation angle or the number of rotations) is generated. The system control unit 210 analyzes this pulse signal, thereby controlling each unit of the digital camera 100.

The shutter button 121 has a first switch SW1 and a second switch SW2. The first switch SW1 is turned on when the shutter button 121 is pressed halfway during an operation. A signal for instructing image-capturing preparation is thereby transmitted to the system control unit 210. Upon receiving the signal indicating that the first switch SW1 is turned on, the system control unit 210 starts operation such as the AF processing, the AE processing, the AWB processing, and the EF processing. The second switch SW2 is turned on in a fully pressed state, which is a state where the operation of the shutter button 121 is completed. A signal for instructing image-capturing start is thereby transmitted to the system control unit 210. Upon receiving the signal indicating that the second switch SW2 is turned on, the system control unit 210 performs a series of image-capturing operations, from reading out of a signal from the image capturing unit 204 to writing of image data into the storage medium 130.

The mode selection switch 104 is provided to switch the operation mode of the digital camera 100 between various modes such as a still image capturing mode, a moving image capturing mode, and a playback mode. The still image capturing mode includes, in addition to an automatic image capturing mode, a panoramic image capturing mode for synthesizing a panoramic image by performing panoramic image capturing.

The digital camera 100 includes a power supply unit 214 and a power supply control unit 218. The power supply unit 214 is a primary battery such as an alkaline cell or a lithium battery, or a secondary battery such as a NiCd battery, a NiMH battery, or a Li battery. Alternatively, the power supply unit 214 is an alternating current (AC) adapter. The power supply unit 214 supplies electric power to the power supply control unit 218. The power supply control unit 218 detects whether a battery is attached to the power supply unit 214. The power supply control unit 218 also detects the type of a battery and a remaining battery level. Based on the result of this detection and an instruction from the system control unit 210, the power supply control unit 218 supplies a necessary voltage for a necessary period, to each of the units including the storage medium 130.

The digital camera 100 includes a storage medium interface (I/F) 216. When the storage medium 130 is inserted into the storage medium slot (not illustrated), the storage medium I/F 216 enables communication between the storage medium 130 and the system control unit 210. The storage medium 130 has been already described in detail with reference to FIG. 1, and thus will not be described here.

Next, a method for panoramic image capturing and a method for synthesizing a panoramic image from a plurality of captured images will be described. First, processing for cutting out a predetermined region from image data of a captured image for synthesizing a panoramic image will be described.

FIGS. 3A, 3B, 3C, and 3D are diagrams illustrating a relationship between a direction of movement of the digital camera 100 in panoramic image capturing and a cut-out region of image data.

Figure 3A:
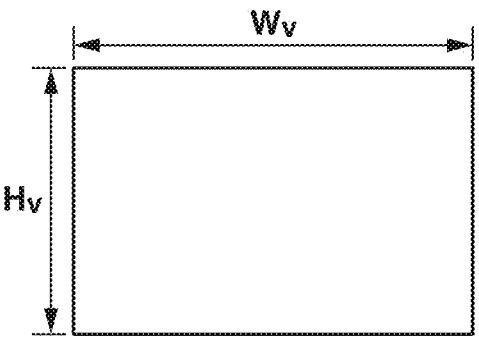
FIGS. 3A, 3B, 3C, and 3D are diagrams illustrating a relationship between a direction of movement of a digital camera in panoramic image capturing and a cut-out region of image data according to an exemplary embodiment of the present disclosure.
Figure 3B:
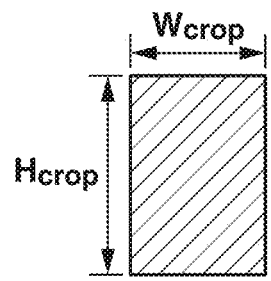

FIG. 3A illustrates an effective image region of an image capturing element included in the image capturing unit 204. In FIG. 3A, "Wv" represents the number of effective pixels in a horizontal direction, and "Hv" represents the number of effective pixels in a vertical direction. FIG. 3B illustrates a cut-out region, which is cut out from image data of a captured image. In FIG. 3B, "Wcrop" represents the number of cut-out pixels in the horizontal direction, and "Hcrop" represents the number of cut-out pixels in the vertical direction.

Figure 3C:
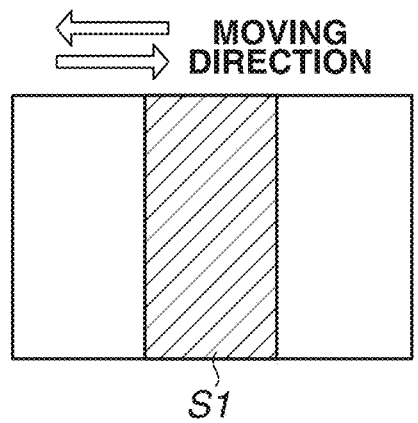

FIG. 3C is a diagram illustrating a cut-out region with respect to image data in a case where panoramic image capturing is performed while the digital camera 100 is moved in the horizontal direction indicated with arrows. A hatched region S1 in FIG. 3C indicates the cut-out region from the image data, and satisfies the following expressions ((1) and (2)).

$$Wv > Wcrop \quad (1)$$

$$Hv = Hcrop \quad (2)$$

Figure 3D:
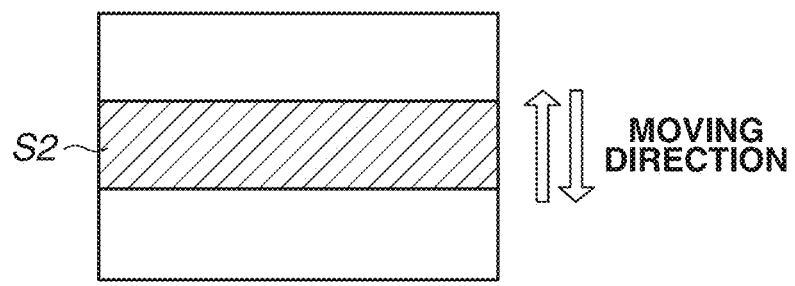

Similarly, FIG. 3D is a diagram illustrating a cut-out region with respect to image data in a case where panoramic image capturing is performed while the digital camera 100 is moved in the vertical direction indicated with arrows. A hatched region S2 in FIG. 3D indicates the cut-out region from the image data, and satisfies the following expressions (3) and (4).

$$Wv = Wcrop \quad (3)$$

$$Hv > Hcrop \qquad (4)$$

The cut-out region of the image data of the captured image may be different for each piece of image data. Further, as for image data at the start of the panoramic image capturing and the image data at the end of the panoramic image capturing, a cut-out region may be wide to have a wide field angle. For example, a cut-out region of image data can be decided, based on the difference between an angle of the digital camera 100 immediately after image capturing and an angle of the digital camera 100 of an immediately preceding frame. The storage capacity of the memory 209 can be saved by cutting out only image data necessary for panoramic-image synthesis processing, and storing the cut-out image data.

The cut-out region described above may be as close to the center of the captured image as possible. This is because, in general, the center of a captured image has less deformation, and therefore, a more natural image can be synthesized if the cut-out region is set at the center of the image.

Next, a method for synthesizing a panoramic image will be described. The system control unit 210 reads out image data indicating a cut-out region stored in panoramic image capturing from the memory 209, and performs panoramic synthesis on the read-out image data.

Figure 4A:
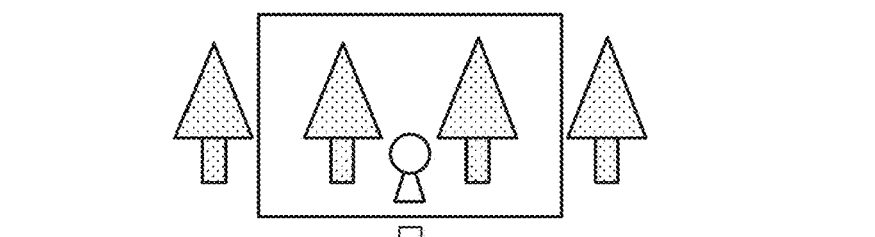
FIGS. 4A, 4B, 4C, 4D, 4E, and 4F are diagrams illustrating a flow of panoramic-image synthesis processing according to an exemplary embodiment of the present disclosure.
Figure 4B:
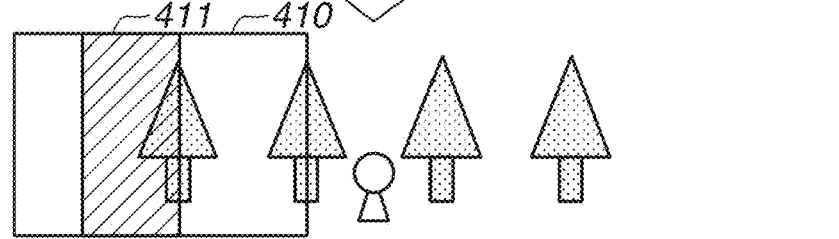
Figure 4C:
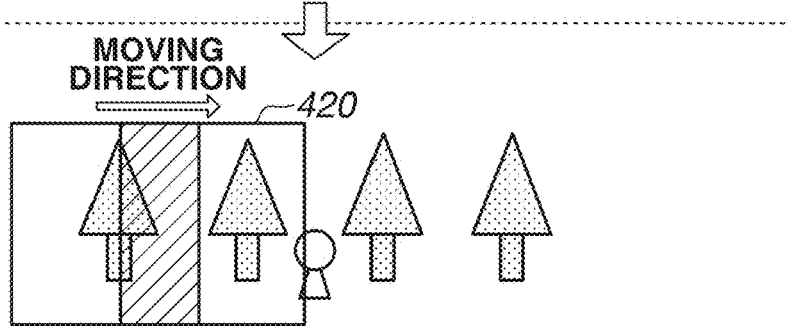
Figure 4D:
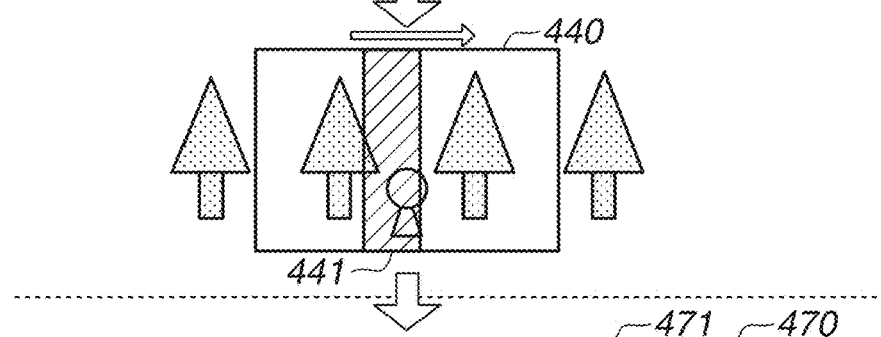
Figure 4E:
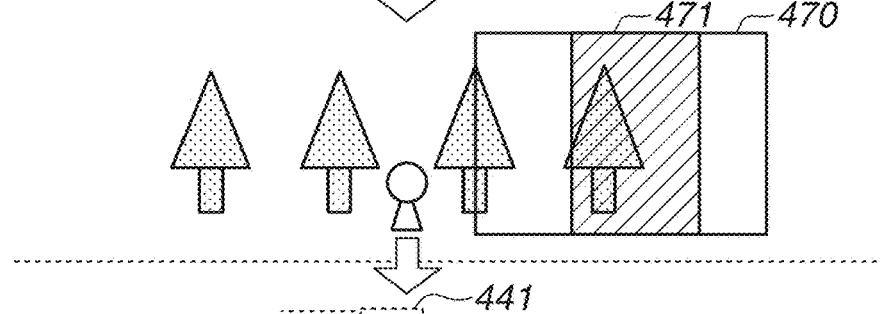

FIGS. 4A, 4B, 4C, 4D, 4E, and 4F are diagrams illustrating a flow of panoramic-image synthesis processing. In FIGS. 4A to 4F, a dotted region schematically represents a row of trees in an image sensing field, and a hatched region represents a cut-out region of image data. FIG. 4A illustrates a state where the shutter button 121 is pressed by the user and thereby the first switch SW1 is turned on. FIG. 4A illustrates a state where the user performs focus adjustment for a main object. FIG. 4B illustrates a position at which the second switch SW2 of the shutter button 121 is turned on. A field angle is set to align with one edge of a panoramic image that the user intends to synthesize. In FIG. 4B, the image capturing unit 204 captures an image 410. FIG. 4C to FIG. 4E schematically illustrate a state where panoramic image capturing is performed while the digital camera 100 is moved toward the other edge of the panoramic image that the user intends to synthesize. FIG. 4E illustrates a state where the user has stopped pressing the shutter button 121, and the panoramic image capturing is finished. In FIG. 4B to FIG. 4E, the image capturing unit 204 captures the image 410 to an image 470 that are seven images in total. However, the images 430, 450, and 460 are not illustrated. The image processing unit 206 performs cut-out processing for the images 410 to 470 captured by the image capturing unit 204, and thereby generates cut-out regions 411 to 471. The width of a cut-out region may be determined beforehand by the system control unit 210, but may be changed depending on the moving speed of the digital camera 100 in the panoramic image capturing.

Figure 4F:
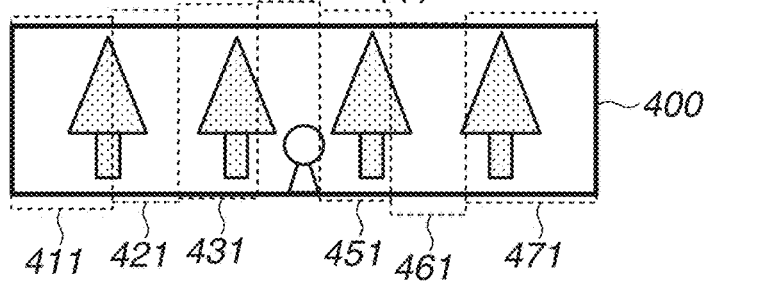

FIG. 4F illustrates a panoramic image synthesized by the image processing unit 206 from a plurality of images captured by the image capturing unit 204. Here, the system control unit 210 performs alignment of images before performing synthesis. In addition, the image processing unit 206 performs cut-out processing for a longitudinal direction, because the upper sides and the lower sides of the respective cut-out regions 411 to 471 are not aligned due to a factor such as camera shake. As a result, the image processing unit 206 generates a panoramic image indicated by a region 400.

In a conventional way of alignment, in general, the image processing unit 206 detects a plurality of motion vectors, and the system control unit 210 performs alignment based on the plurality of motion vectors. For example, the image processing unit 206 divides a cut-out region into small blocks of arbitrary sizes, and calculates a correspondence point at which the sum of absolute difference (SAD) of luminance becomes a minimum for each of the small blocks. The system control unit 210 can calculate a motion vector from the calculated correspondence point at which the SAD becomes the minimum.

For simplification, FIGS. 4A to 4F illustrate an example in which there is no region where the cut-out regions 411 to 471 are overlaid with each other, and the cut-out regions 411 to 471 are next to each other. If the overlaid region is present, the image processing unit 206 performs processing as follows. Using the center of the overlaid region as a border, the image processing unit 206 outputs pixel information, corresponding to one cut-out region on the left side of the border and another cut-out region on the right side of the border, to the synthetic image. Alternatively, the image processing unit 206 performs processing as follows. First, the image processing unit 206 outputs a value, obtained by synthesizing 50% of pixel information of one cut-out region and that of the other cut-out region, to the border. The image processing unit 206 then performs synthesis, while increasing the proportion of the one cut-out region on the left side of the border, and increasing the proportion of the other cut-out region on the right side of the border, as the distance from the border increases.

In the present exemplary embodiment, unlike the conventional way of alignment, the image processing unit 206 described above selects the detected plurality of motion vectors, by using information such as the angular velocity information detected by the detection unit 215. A flow of the present exemplary embodiment will be described below, with reference to a flowchart.

Figure 5:
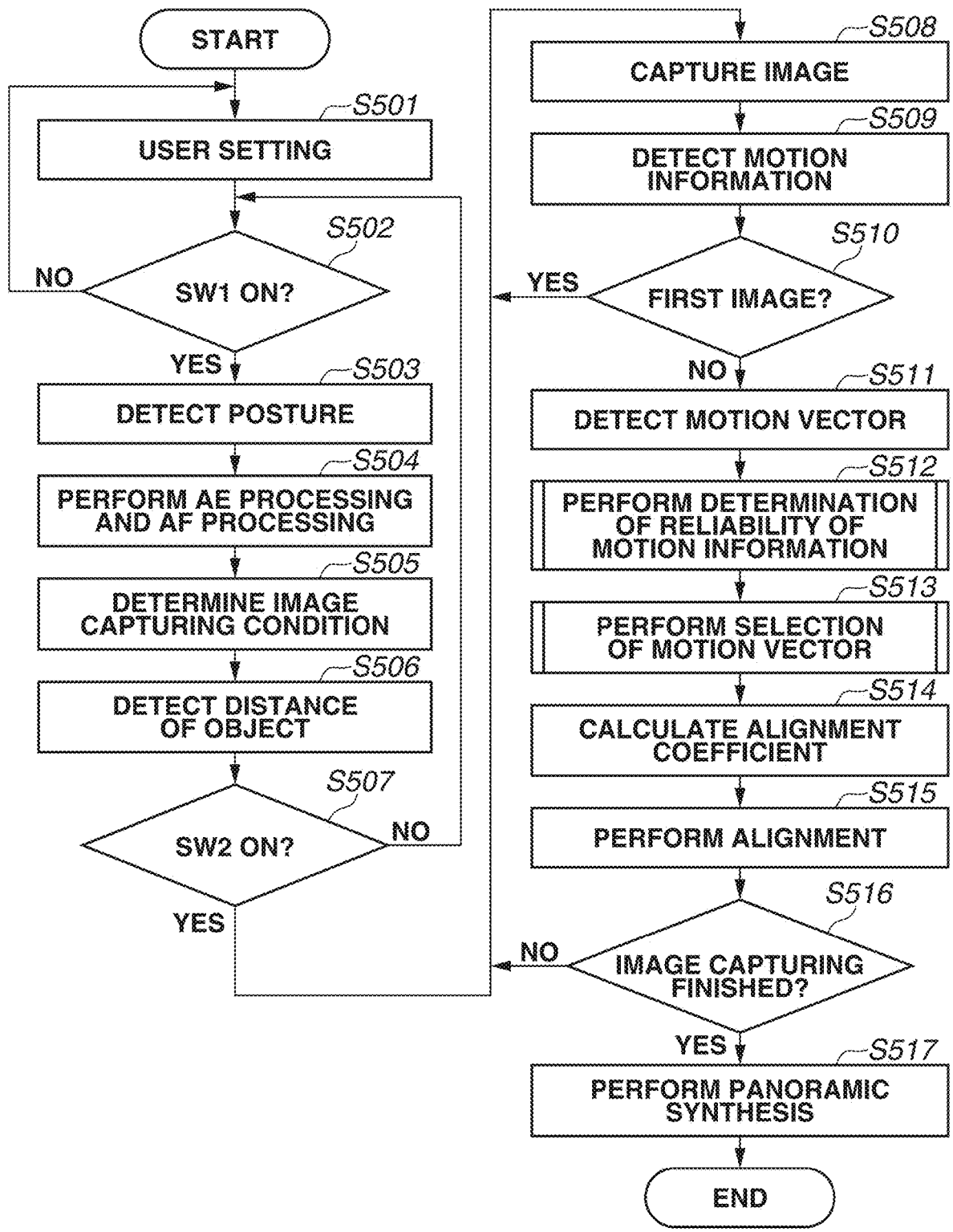
FIG. 5 is a flowchart illustrating an exemplary embodiment of the present disclosure.

FIG. 5 is a flowchart illustrating the present exemplary embodiment. In a case where the user selects a panoramic-image synthesis mode by using the mode selection switch 104, the digital camera 100 executes processing illustrated in FIG. 5.

In step S501, the user performs setting for panoramic image capturing. For example, the user sets information such as a field angle and an image capturing direction for a panoramic synthetic image. In a case where setting is not performed by the user in step S501, the digital camera 100 uses the initial setting, or the setting used in the previous panoramic image capturing, in the current panoramic image capturing.

Next, in step S502, the system control unit 210 determines whether the first switch SW1 is pressed. If the system control unit 210 determines that the first switch SW1 is pressed (YES in step S502), the processing proceeds to step S503. If the system control unit 210 determines that the first switch SW1 is not pressed (NO in step S502), the processing returns to step S501.

In step S503, the detection unit 215 performs posture detection processing. The detection unit 215 determines an orientation of the digital camera 100, in the posture detection processing. In a case where an orientation of the digital camera 100 is set beforehand by the user in step S501, the system control unit 210 compares the set orientation and the actual orientation of the digital camera 100, and gives a warning as appropriate if there is a difference.

In step S504, the digital camera 100 performs the AE processing and the AF processing.

In step S505, the system control unit 210 determines an image capturing condition such as image capturing sensitivity, based on the result of the AE processing in step S504.

In step S506, the digital camera 100 detects a distance of an object. Specifically, the system control unit 210 detects the distance of the object, based on a focal length determined by focusing performed by the image capturing unit 204 in the AF processing in step S504.

Next, in step S507, the system control unit 210 determines whether the second switch SW2 is pressed. If the system control unit 210 determines that the second switch SW2 is not pressed (NO in step S507), the processing returns to step S502. The system control unit 210 then determines whether the first switch SW1 remains pressed (whether in a half pressed state). If the system control unit 210 determines that the second switch SW2 is pressed (YES in step S507), the processing proceeds to step S508. In step S508, the image capturing unit 204 performs image capturing, based on the image capturing condition decided by the system control unit 210 in step S505.

In step S509, the detection unit 215 detects motion information such as an angular velocity. The motion information detected by the detection unit 215 is used for calculation of an alignment coefficient later in step S514.

In step S510, the system control unit 210 determines whether the image captured by the image capturing unit 204 in step S508 is the first image. If the image captured by the image capturing unit 204 in step S508 is the first image, only this one image is stored in the memory 209 and thus, the image processing unit 206 cannot perform alignment. Therefore, if the system control unit 210 determines that the captured image is the first image (YES in step S510), it is necessary for the flow to return to step S508. On the other hand, if the system control unit 210 determines that the captured image is not the first image (NO in step S510), the processing proceeds to step S511.

In step S511, the system control unit 210 detects a motion vector. The image processing unit 206 sets a plurality of small blocks for one of two images. Preferably, the small blocks are set to be of the same size. Further, the image processing unit 206 may set small blocks in a part of the image, instead of in the entire image. The system control unit 210 selects any one of the plurality of small blocks set in one of the images. The system control unit 210 then sets a search block in the other of the images. The search block is at the same position as the position of the selected small block and is wider than this small block. The system control unit 210 extracts a region, which has the highest correlation with the selected small block in the one of the images (i.e., a region in which the value of SAD is the minimum), within in the search block of the other of the images. Based on the coordinates of a correspondence point that is the center of the extracted region and the coordinates of the central position of the selected small block, the system control unit 210 can calculate a motion vector corresponding to the small block. The system control unit 210 performs this processing for all the small blocks, and calculates a motion vector corresponding to each of all the small blocks.

In step S512, the system control unit 210 determines the reliability of the motion information. This will be described in detail below.

In step S513, the system control unit 210 selects a motion vector. This will be described in detail below.

In step S514, the system control unit 210 calculates an alignment coefficient by using the motion vector selected in step S513. In a case where only a translation motion is sufficient, the system control unit 210 can use an average value of the motion vectors selected in step S513. Alternatively, the system control unit 210 counts motion vectors indicating the same direction among the motion vectors selected in step S513, and uses the motion vector of the largest number. If it is necessary to perform expansion/reduction or rotation processing for an image, the system control unit 210 uses, for example, a projective transformation coefficient as the alignment coefficient. However, the alignment coefficient is not limited to the projective transformation coefficient. An affine transformation coefficient or a simplified alignment coefficient including only a horizontal/vertical shift may be used.

In step S515, the system control unit 210 performs alignment. For example, the system control unit 210 can perform alignment by using the following expression (5).

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \qquad (5)$$

In this expression (5), (x', y') represents coordinates after the alignment, and (x, y) represents coordinates before the alignment. A matrix A represents the alignment coefficient calculated by the system control unit 210 in step S515.

In step S516, the system control unit 210 determines whether the image capturing is finished. If the image capturing continues (NO in step S516), the processing returns to step S508. If the image capturing is finished (YES in step S516), the processing proceeds to step S517. The system control unit 210 determines whether the image capturing is fished, based on the user setting in step S501. For example, the system control unit 210 determines that the image capturing is fished, when the field angle set in step S501 is attained.

In step S517, the image processing unit 206 performs panoramic synthesis. First, the image processing unit 206 cuts out a region for each of two images next to each other. In consideration of deformation, typically, it is preferable that the image processing unit 206 set the cut-out region at the center of each image. Next, the image processing unit 206 performs synthetic processing for the two cut-out regions. The synthetic processing is described in detail above with reference to FIG. 4, and thus will not be described here.

<Determination of Reliability of Motion Information and Selection of Motion Vector>

Next, the determination of the reliability of the motion information in step S512 will be described.

As described above, the system control unit 210 detects the motion vector by performing the comparison between the images in step 511. However, some of motion vectors may be incorrectly detected depending on image. Incorrect detection of a motion vector is highly likely to occur, for a certain type of scene. Examples of this scene include a scene having consecutive similar patterns such as a sky or a lawn, and a scene having a constantly changing pattern such as a wave or a waterfall.

To address such a problem, the system control unit 210 determines the reliability of a motion vector by using the motion information detected by the detection unit 215 in step S509. If the difference between the motion information and the motion vector is large, the system control unit 210 determines that the motion vector is highly likely to be detected incorrectly. The system control unit 210 then prevents the motion vector from being used for the calculation of the alignment coefficient in step S515.

However, the motion information detected by the detection unit 215 in step S509 may not be correct and may include a large error. If an error of the motion information detected by the detection unit 215 is large, a correct motion vector may not be selected in step S513. In this case, the accuracy of the alignment is decreased by using the motion information.

Therefore, in step S512, the system control unit 210 determines the reliability of the motion information, and selects the motion vector in step S513, in consideration of the reliability of the motion information.

The reliability of the motion information is determined by the property of the detection unit 215, and may change by various influences during the image capturing. When detecting such a scene in which the reliability may be affected, the system control unit 210 adjusts the reliability and sets a threshold based on the adjusted reliability. Specifically, the system control unit 210 compares the difference between the motion information and the motion vector with the threshold. If the difference between the motion information and the motion vector exceeds the threshold, this motion vector is not selected, and a threshold is determined based on the above-described reliability.

An example of a change in error of the motion information is as follows. If the variance of velocity at each time detected by the detection unit 215 during image capturing is large, the error of the motion information detected in step S509 is likely to be large as well.

Figure 6A:
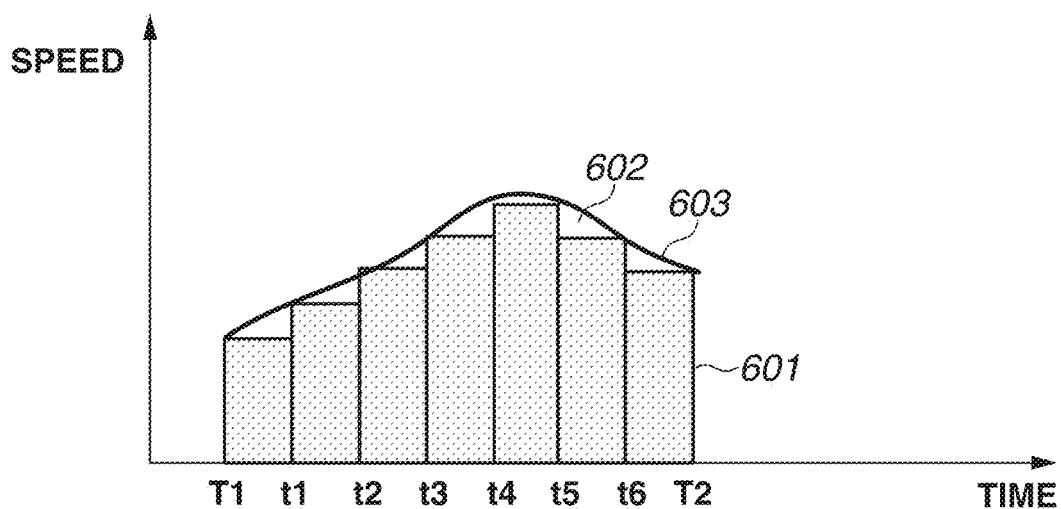
FIGS. 6A and 6B are diagrams illustrating an error of motion information detected by a detection unit according to an exemplary embodiment of the present disclosure.
Figure 6B:
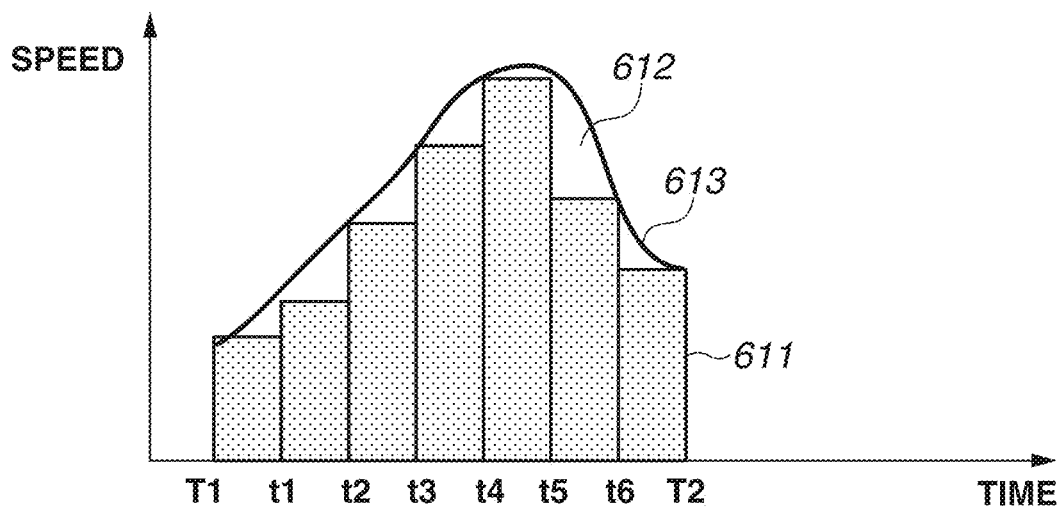

FIGS. 6A and 6B are diagrams illustrating the error of the motion information detected by the detection unit 215 in the present exemplary embodiment. For simplification, assume that the image capturing unit 204 two-dimensionally moves in a single direction, and the detection unit 215 detects the speed of the movement of the image capturing unit 204. Assume that at a time T1 and a time T2, exposure for image capturing by the image capturing unit 204 is performed, and exposure for image capturing is not performed at any time between the time T1 and the time T2. Further, assume that the detection unit 215 detects the speed of the image capturing unit 204 at the time T1 and at six time points (times t1 to t6) provided between the time T1 and the time T2 at equal intervals. The system control unit 210 detects the entire area of vertical bars 601 having a check pattern in FIG. 6A, as the motion information. Similarly, the system control unit 210 detects the entire area of vertical bars 611 in FIG. 6B, as the motion information. In FIG. 6A and FIG. 6B, a curve 603 and a curve 613 each indicates the speed of the actual continuous motion of the image capturing unit 204, and blank portions 602 and 612 each indicates an error in the detection of the detection unit 215. When FIG. 6A and FIG. 6B are compared, the area of the blank portion 612 indicating an error is larger in FIG. 6B in which the variance is large.

As described above, the error of the motion information is likely to be large if the variance of the velocity detected by the detection unit 215 is large. Upon comparing the motion information indicating a large error with the motion vector, the system control unit 210 increases the above-described threshold for the difference, in order to prevent a correct motion vector from being incorrectly excluded.

Another example of the change in the error of the motion information is an influence attributable to a motion of the shutter 203 in a case where the shutter 203 is a mechanical shutter. If the shutter 203 is a mechanical shutter operates, the digital camera 100 may vibrate, and thereby affect the detection accuracy of the gyro sensor provided in the detection unit 215. However, such an influence occurs mainly in a direction in which the mechanical shutter operates. An influence that occurs in a direction orthogonal to this direction is small.

Further, another factor that affects the error of the motion information is the situation immediately after the start-up of the digital camera 100. In the situation immediately after the start-up of the digital camera 100, the way noise occurs may be different from that in normal situations, and the error of the motion information detected by the detection unit 215 may be large.

Furthermore, another factor that affects the error of the motion information is an object distance. When the system control unit 210 detects a motion vector between images for an object in a short range, there may be a large deviation from the motion information detected by the detection unit 215. This is because the detection unit 215 converts the angular velocity information obtained from the gyro into the motion information based on the object distance serving as a reference, and thus a deviation from this object distance becomes large if the object distance is short.

The detection of the motion information, the detection of the motion vector, and the calculation of the alignment coefficient described above may be performed in each of X and Y directions, by using a two-dimensional coordinate system (typically, an orthogonal system). The system control unit 210 may assume that the X direction is a direction parallel to the moving direction of the digital camera 100 and the Y direction is the direction orthogonal to the X direction. More specifically, the digital camera 100 performs the detection of the motion information, the detection of the motion vector, the determination of the reliability of the motion information, and the selection of the motion vector, in each of the X and Y directions. In other words, the digital camera 100 may divide each of the motion information obtained in step S509 and the motion vector obtained in step S511 into a component in the X direction and a component in the Y direction. The digital camera 100 may then perform determination for selecting the motion vector in each of these directions. Step S512 and step S513 using the two-dimensional coordinate system will be described in detail below.

Figure 7:
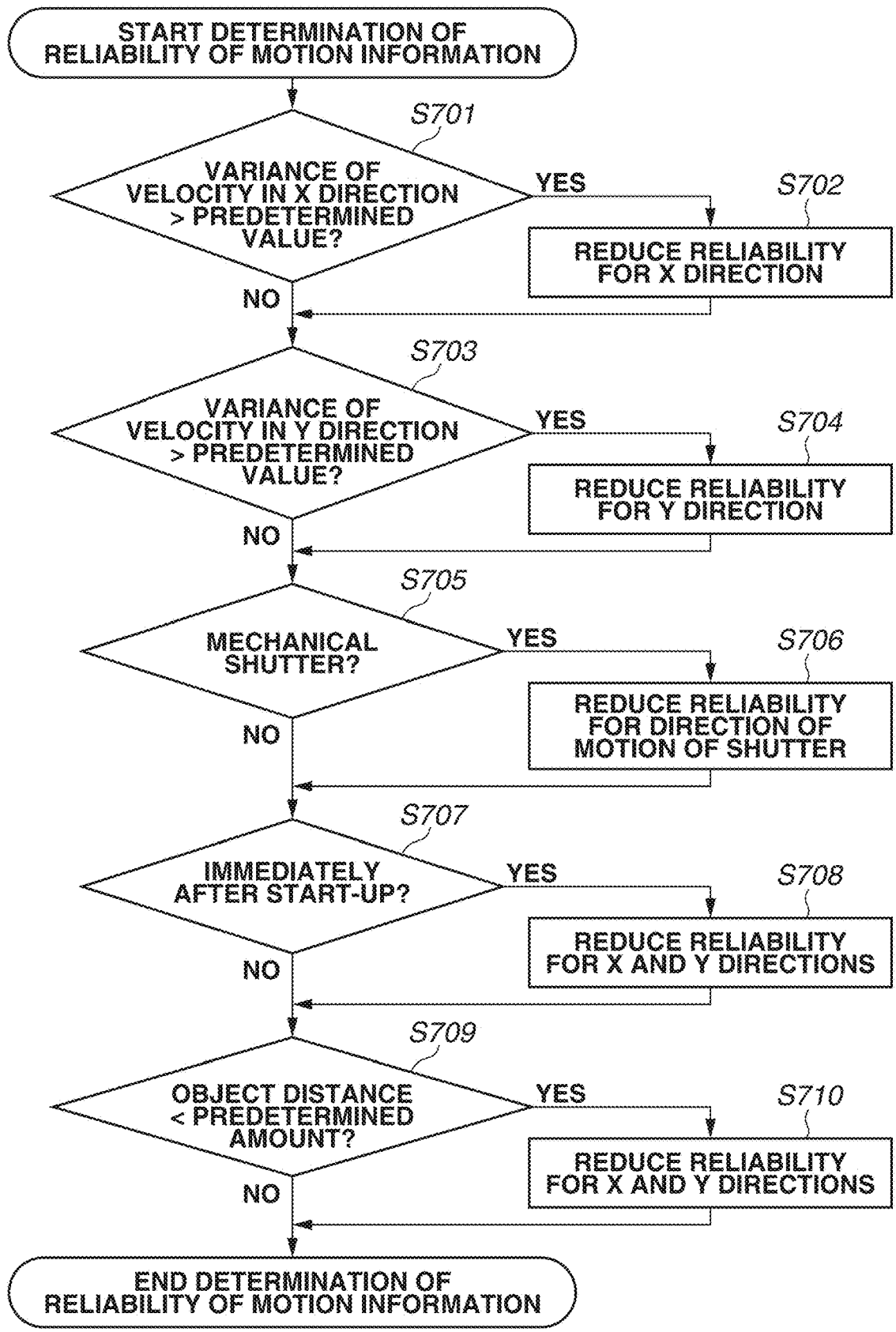
FIG. 7 is a diagram illustrating determination of reliability of motion information according to an exemplary embodiment of the present disclosure.

FIG. 7 is a diagram illustrating the determination of the reliability of the motion information in the present exemplary embodiment. This flow will be described based on the two-dimensional coordinate system having the X and the Y directions, as described above.

In step S701, the system control unit 210 determines whether the variance of velocity in the X direction detected by the detection unit 215 is larger than a predetermined value. If the variance of velocity is larger than the predetermined value (YES in step S701), the processing proceeds to step S702. If the variance of velocity is not larger than the predetermined value (NO in step S701), the processing proceeds to step S703. In step S702, the system control unit 210 reduces the reliability of the motion information for the X direction according to the variance of velocity in the X direction, or reduces the reliability of the motion information for the X direction by a predetermined amount. Step S703 and step S704 are similar to step S701 and step S702, respectively.

In step S705, the system control unit 210 determines whether the shutter 203 is a mechanical shutter. If the shutter 203 is a mechanical shutter (YES in step S705), the processing proceeds to step S706. In step S706, the system control unit 210 reduces the reliability in the direction of the motion of the shutter 203. For example, assume that the horizontal direction is the X direction and the vertical direction is the Y direction. In this case, usually, the digital camera 100 is placed in landscape orientation, and the direction of the motion of the shutter 203 is the Y direction. The system control unit 210 reduces the reliability of the motion information for the Y direction. When the user holds the digital camera 100 obliquely, the direction of the motion of the shutter 203 is not vertical. In such a case as well, if the horizontal direction is the X direction and the vertical direction is the Y direction, the system control unit 210 reduces the reliability of the motion information for the X direction and the Y direction, according to the posture information detected by the detection unit 215 in step S503.

On the other hand, in a case where the shutter 203 is an electronic shutter (NO in step S705), there is no mechanical motion and thus no shake occurs in the digital camera 100. Therefore, the reliability of the motion information remains unchanged. The processing then proceeds to step S707.

In step S707, the system control unit 210 determines whether a time period following the start-up of the digital camera 100 is within a predetermined time (i.e., whether the current time is the time immediately after the start-up). If the time period is within the predetermined time (YES in step S707), the processing proceeds to step S708. In step S708, the system control unit 210 reduces the reliability of the motion information for the X direction and the Y direction. The processing then proceeds to step S709. If the system control unit 210 determines that the current time is not the time immediately after the start-up (NO in step S707), the processing proceeds to step S709.

In step S709, the system control unit 210 determines whether an object distance is less than a predetermined amount. If the object distance is less than the predetermined amount (YES in step S709), the processing proceeds to step S710. In step S710, the system control unit 210 reduces the reliability of the motion information for the X direction and the Y direction. If the system control unit 210 determines that the object distance is not less than the predetermined amount (NO in step S709), the processing ends without reducing the reliability of the motion information.

Figure 8:
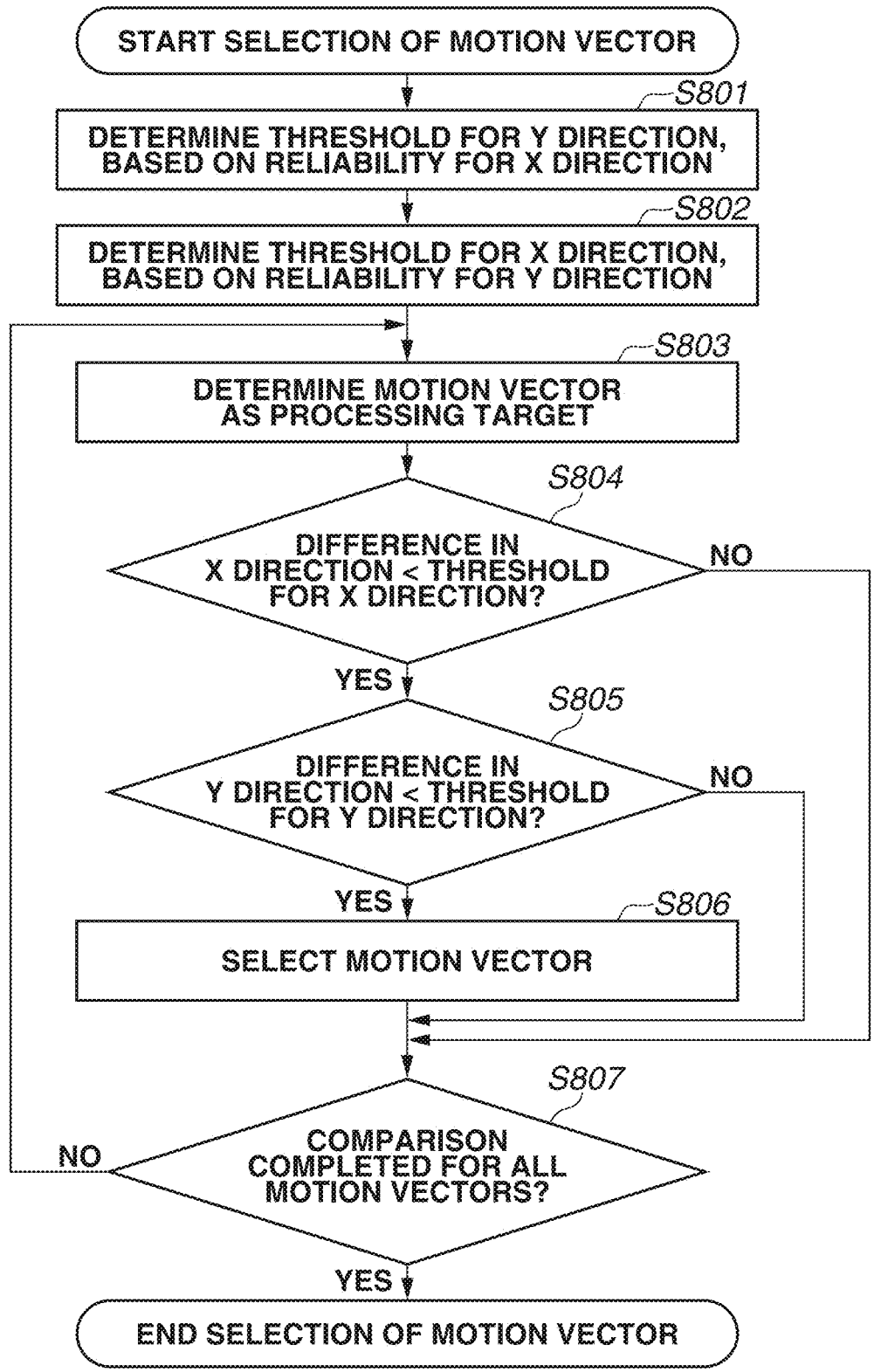
FIG. 8 is a flowchart illustrating selection of a motion vector according to an exemplary embodiment of the present disclosure.

FIG. 8 is a flowchart illustrating the selection of the motion vector in the present exemplary embodiment.

In step S801, the system control unit 210 determines a threshold for the Y direction, based on the reliability of the motion information for the X direction determined in step S512. In step S802, the system control unit 210 decides a threshold for the X direction, based on the reliability of the motion information for the Y direction determined in step S512. The system control unit 210 decides a larger threshold for lower reliability.

In step S803, the system control unit 210 determines, as a processing target, an arbitrary motion vector among motion vectors for which a comparison to be described below in each of step S804 and step S805 has not yet been performed.

In step S804, the system control unit 210 compares a component for the X direction of the motion vector serving as the processing target, with a component for the X direction of the motion information. If the difference between the components is smaller than the threshold for the X direction (YES in step 804), the processing proceeds to step S805. If the difference is not smaller than the threshold (NO in step 804), the processing proceeds to step S807.

In step S805, the system control unit 210 compares a component for the Y direction of the motion vector serving as the processing target, with a component for the Y direction of the motion information. If the difference between the components is smaller than the threshold for the Y direction (YES in step 805), the processing proceeds to step S806. If the difference is not smaller than the threshold (NO in step 805), the processing proceeds to step S807.

In step S806, the system control unit 210 selects the motion vector determined as the processing target in step S803. In other words, the system control unit 210 uses the motion vector determined as the processing target in step S803, for the calculation of the alignment coefficient in step S514.

In step S807, the system control unit 210 determines whether the comparison is completed for all the motion vectors. If the comparison is completed for all the motion vectors (YES in step S807), the processing for the selection of the motion vector ends. If the comparison is not completed for all the motion vectors (NO in step S807), the processing returns to step S803.

FIGS. 9A, 9B, 9C and 9D are diagrams illustrating the selection of the motion vector in the present exemplary embodiment.

Figure 9A:
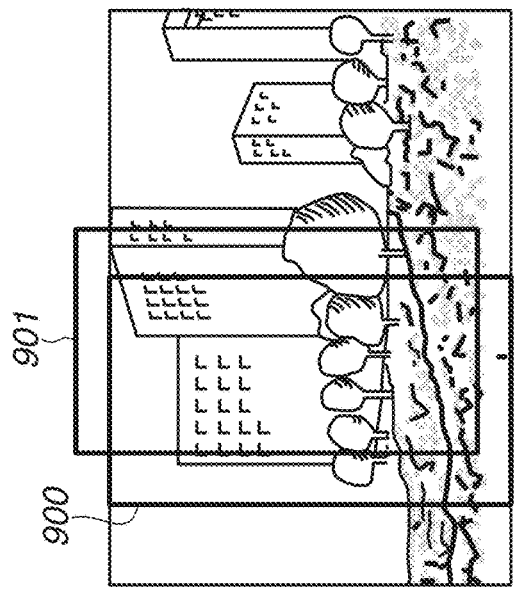
FIGS. 9A, 9B, 9C and 9D are diagrams illustrating selection of a motion vector according to an exemplary embodiment of the present disclosure.
Figure 9B:
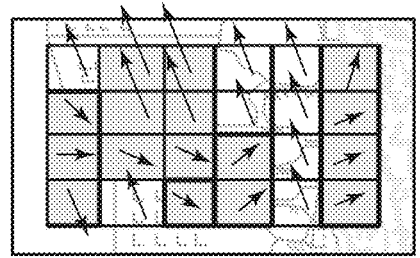
Figure 9C:
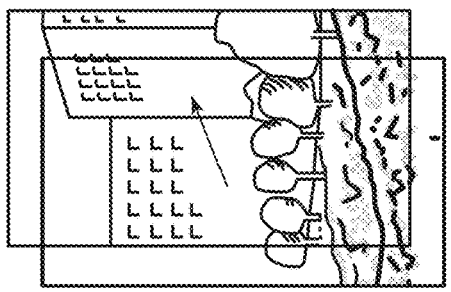
Figure 9D:
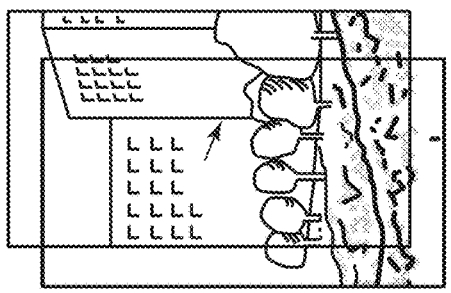

Assume that an image 900 and an image 901 are two images captured by the image capturing unit 204. Further, assume that the motion information such as the velocity of the digital camera 100 is detected by the detection unit 215, while the image capturing is performed by the image capturing unit 204. The system control unit 210 detects the motion vector for each block. An arrow in Part (1) of FIG. 9B represents the motion information for a case where the reliability is high for both of the X and Y directions. An arrow in Part (1) of FIG. 9C represents the motion information for a case where the reliability is low for the X direction. An arrow in Part (1) of FIG. 9D represents the motion information for a case where the reliability is low for the Y direction. Part (2) of FIG. 9B, Part (2) of FIG. 9C, and Part (2) of FIG. 9D each illustrate the motion vector for each block and the result of the selection of the motion vector. Part (2) of FIG. 9B, Part (2) of FIG. 9C, and Part (2) of FIG. 9D correspond to the case where the reliability is high for both of the X and Y directions, the case where the reliability is low for the X direction, and the case where the reliability is low for the Y direction, respectively. In a case where the reliability of the motion information of the digital camera 100 obtained from the detection unit 215 is high, only a motion vector having a small difference from the motion information is selected. Thus, the motion vector can be selected with high accuracy. A region 902 is incorrectly selected in a case where the reliability for the X direction is low, and a region 903 is incorrectly selected in a case where the reliability for the Y direction is low. However, most of the incorrectly detected motion vectors can be excluded, and the correct motion vectors are not excluded.

According to the present exemplary embodiment, it is possible to perform the alignment processing with higher accuracy, by selecting the motion vector through use of the motion information, while taking into account the reliability of the motion information of the digital camera 100 detected by the detection unit 215.

In the exemplary embodiment described above, the description is provided based on a digital camera for private use. However, the exemplary embodiment is applicable to any type of apparatus such as a portable device, a smartphone, or a network camera connected to a server, if the apparatus is equipped with a panoramic image capturing and synthesizing function.

The present disclosure can also be implemented by such processing that a program for implementing one or more functions of the above-described exemplary embodiment is supplied to a system or apparatus via a network or storage medium. One or more processors in a computer of the system or apparatus read the program and execute the read program. Moreover, the present disclosure can also be implemented by a circuit (e.g., an application-specific integrated circuit (ASIC)) for implementing one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-126240, filed Jun. 28, 2017, which is hereby incorporated by reference herein in its entirety.

What is claimed is:

1. An image processing apparatus, comprising:
at least one memory configured to store instructions; and
at least one processor connected to the at least one memory and configured to execute the instructions to:
perform first detection to detect motion information of an image sensor in a time period between capturing of a first image and capturing of a second image by the image sensor, based on an output of a gyro and/or accelerator,
perform second detection to detect a plurality of motion vectors between the first image and the second image,
determine reliability of the motion information detected in the first detection, and
perform alignment of the first image and the second image, based on at least a part of the plurality of motion vectors,
wherein the at least one processor executes further instruction to:
determine the motion vector to be used for the alignment, based on the motion information and the reliability,
set a threshold based on the reliability in a first direction and a threshold in a second direction,
wherein, among the plurality of motion vectors, a motion vector having a difference from the motion information that is smaller than the threshold is used for the alignment, and
wherein a motion vector, having a difference between a component of each of the plurality of motion vectors in the first direction and a component of the motion information that is smaller than the threshold in the first direction and having a difference between a component of each of the plurality of motion vectors in the second direction and a component of the motion information that is smaller than the threshold in the second direction, is used for the alignment.

2. The image processing apparatus according to claim 1, wherein the at least one processor executes further instruction to perform the second detection by setting a plurality of regions in the first image, and detecting the plurality of motion vectors by using the plurality of regions.

3. The image processing apparatus according to claim 2, wherein the plurality of regions is of a same size.

4. The image processing apparatus according to claim 1, wherein the at least one processor executes further instruction to set, in a case where the reliability is a first value, the threshold to a first threshold, and to set the threshold, in a case where the reliability is a second value which is larger than the first value, to a second threshold,
wherein the first threshold is larger than the second threshold.

5. The image processing apparatus according to claim 4, wherein the at least one processor executes further instruction to determine that the reliability is lower as variance of the motion information is larger.

6. The image processing apparatus according to claim 4, wherein the at least one processor executes further instruction to determine that, in a case where a time period following start of the first detection is within a predetermined time, the reliability is lower than a case where the time period is not within the predetermined time.

7. The image processing apparatus according to claim 4, wherein the at least one processor executes further instruction to determine that, in a case where an object distance in the first image or the second image is less than a predetermined object distance, the reliability is lower than a case where the object distance is not less than the predetermined object distance.

8. The image processing apparatus according to claim 1, wherein the first direction is a direction parallel to a moving direction of the image sensor in the time period between capturing of the first image and capturing of the second image.

9. The image processing apparatus according to claim 1, wherein the first direction is a direction set beforehand.

10. The image processing apparatus according to claim 1, wherein the at least one processor executes further instruction to
determine the reliability in the first direction and the reliability in the second direction, of the motion information, and
set, in a case where the reliability in the first direction and the second direction is a first value, the threshold to a larger value than a value in a case where the reliability is a second value larger than the first value.

11. The image processing apparatus according to claim 10, wherein the at least one processor executes further instruction to determine that the reliability in the first direction is lower, as variance of component of the motion information in the first direction is larger, and that the reliability in the second direction is lower, as variance of component of the motion information in the second direction is larger.

12. The image processing apparatus according to claim 10, wherein the at least one processor executes further instruction to determine that, in a case where a time period following start of the first detection is within a predetermined time, the reliability in the first direction and the reliability in the second direction are lower than a case where the time period is not within the predetermined time.

13. The image processing apparatus according to claim 10, wherein the at least one processor executes further instruction to determine that, in a case where an object distance in the first image or the second image is less than a predetermined object distance, the reliability in the first direction and the reliability in the second direction are lower than a case where the object distance is not less than the predetermined object distance.

14. The image processing apparatus according to claim 10, wherein the at least one processor executes further instruction to determine that, in a case where a motion of a mechanical shutter occurs and a direction of the motion of the mechanical shutter is the second direction when the image sensor performs image capturing, the reliability in the second direction is lower than a case where the direction of the motion of the mechanical shutter is the first direction.

15. The image processing apparatus according to claim 1, wherein the first direction and the second direction are vertical.

16. The image processing apparatus according to claim 1, wherein the at least one processor executes further the instruction to synthesize a panoramic image by using a plurality of images including the first image and the second image.

17. The image processing apparatus according to claim 16, wherein the plurality of images are captured by an image sensor when the image sensor is moving along the first direction.

18. An image pickup apparatus, comprising:
an image sensor;
at least one memory configured to store instructions; and
at least one processor connected to the at least one memory and configured to execute the instructions to:
perform first detection to detect motion information of an image sensor in a time period between capturing of a first image and capturing of a second image by the image sensor, based on an output of a gyro and/or accelerator,
perform second detection to detect a plurality of motion vectors between the first image and the second image,
determine reliability of the motion information detected in the first detection, and
perform alignment of the first image and the second image, based on at least a part of the plurality of motion vectors,
wherein the at least one processor executes further instruction to:
determine the motion vector to be used for the alignment, based on the motion information and the reliability,
set a threshold based on the reliability in a first direction and a threshold in a second direction,
wherein, among the plurality of motion vectors, a motion vector having a difference from the motion information that is smaller than the threshold is used for the alignment, and
wherein a motion vector, having a difference between a component of each of the plurality of motion vectors in the first direction and a component of the motion information that is smaller than the threshold in the first direction and having a difference between a component of each of the plurality of motion vectors in the second direction and a component of the motion information that is smaller than the threshold in the second direction, is used for the alignment.

19. A method to control an image processing apparatus, the method comprising:
performing first detection to detect motion information of an image sensor in a time period between capturing of a first image and capturing of a second image by the image sensor, based on an output of a gyro and/or accelerator;
performing second detection to detect a plurality of motion vectors between the first image and the second image;
determining reliability of the motion information detected in the first detection;
performing alignment of the first image and the second image, based on at least a part of the plurality of motion vectors; and
determining the motion vector to be used for the alignment, based on the motion information and the reliability,
setting a threshold based on the reliability in a first direction and a threshold in a second direction,
wherein, among the plurality of motion vectors, a motion vector having a difference from the motion information that is smaller than the threshold is used for the alignment, and
wherein a motion vector, having a difference between a component of each of the plurality of motion vectors in the first direction and a component of the motion information that is smaller than the threshold in the first direction and having a difference between a component of each of the plurality of motion vectors in the second direction and a component of the motion information that is smaller than the threshold in the second direction, is used for the alignment.

20. A non-transitory computer readable storage medium, which stores instructions,
wherein at least one processor connected to at least one memory and configured to execute the instructions to:
perform first detection to detect motion information of an image sensor in a time period between capturing of a first image and capturing of a second image by the image sensor, based on an output of a gyro and/or accelerator,
perform second detection to detect a plurality of motion vectors between the first image and the second image,
determine reliability of the motion information detected in the first detection, and
perform alignment of the first image and the second image, based on at least a part of the plurality of motion vectors,
wherein the at least one processor executes further instruction to:
determine the motion vector to be used for the alignment, based on the motion information and the reliability, set a threshold based on the reliability in a first direction and a threshold in a second direction, wherein, among the plurality of motion vectors, a motion vector having a difference from the motion information that is smaller than the threshold is used for the alignment, and wherein a motion vector, having a difference between a component of each of the plurality of motion vectors in the first direction and a component of the motion information that is smaller than the threshold in the first direction and having a difference between a component of each of the plurality of motion vectors in the second direction and a component of the motion information that is smaller than the threshold in the second direction, is used for the alignment.

* * * * *